United States Patent
Cotarmanac'h et al.

(10) Patent No.: US 9,081,755 B2
(45) Date of Patent: Jul. 14, 2015

(54) METHOD FOR PROCESSING A DATA TREE STRUCTURE

(75) Inventors: Alexandre Cotarmanac'h, Paris (FR); Sylvain Devillers, Rennes (FR)

(73) Assignee: France Telecom, Paris (FR)

( * ) Notice: Subject to any disclaimer, the term of this patent is extended or adjusted under 35 U.S.C. 154(b) by 1290 days.

(21) Appl. No.: 11/918,565

(22) PCT Filed: Apr. 7, 2006

(86) PCT No.: PCT/FR2006/050317
§ 371 (c)(1),
(2), (4) Date: May 12, 2008

(87) PCT Pub. No.: WO2006/108983
PCT Pub. Date: Oct. 19, 2006

(65) Prior Publication Data
US 2009/0063519 A1    Mar. 5, 2009

(30) Foreign Application Priority Data

Apr. 12, 2005  (FR) ..................................... 05 03642

(51) Int. Cl.
*G06F 17/30* (2006.01)
*G06F 17/22* (2006.01)

(52) U.S. Cl.
CPC ........ *G06F 17/2247* (2013.01); *G06F 17/2258* (2013.01); *G06F 17/30908* (2013.01)

(58) Field of Classification Search
CPC .......... G06F 17/30873; G06F 2216/15; G06F 17/30911; G06F 17/2247; G06F 17/2229; G06F 17/30961
See application file for complete search history.

(56) References Cited

U.S. PATENT DOCUMENTS

| 7,516,139 | B2 * | 4/2009 | Ziemann et al. ...................... 1/1 |
| 7,627,604 | B2 * | 12/2009 | Furusho ............................... 1/1 |
| 2003/0084180 | A1 * | 5/2003 | Azami .......................... 709/231 |
| 2004/0064481 | A1 * | 4/2004 | Azami ........................ 707/104.1 |
| 2005/0193331 | A1 * | 9/2005 | Grambihler et al. ........... 715/513 |

OTHER PUBLICATIONS

Wong, Eugene, Y.C., Alvin T.S. Chan, Hong-Va Leong; Semantic-Based Approach to Streaming XML Contents Using Xstream, IEEE Computer Society, 2003.*
E.Y.C. Wong et al., "Semantic-based approach to streaming XML contents, using Xstream", Proceedings of the 27th Annual International Computer Software and Applications Conference, vol. Conf. 26, pp. 91-96, Nov. 3, 2003.

(Continued)

*Primary Examiner* — Dinku Gebresenbet
(74) *Attorney, Agent, or Firm* — Cozen O'Connor (57) ABSTRACT

A method of processing a tree data structure organized into interconnected elements. The method comprises the steps of: defining processing units as subsets of interconnected elements and allocating each processing unit a processing time on which the data of the allocated processing unit is to be used by a unit that is the destination for the data. The processing method can be applied to streaming metadata, in particular for adaptation of scalable multimedia content.

27 Claims, 5 Drawing Sheets

(56) References Cited

OTHER PUBLICATIONS

U. Niedenneier et al., "An MPEG-7 tool for compression and streaming of XML data", 2002 IEEE International Conference on Multimedia Expo, pp. 521-524, Aug. 26, 2002.

C. Barton et al., "Streaming Xpath processings with forward and backward axes", Proceedings 19$^{th}$ International Conference on Data Engineering, vol. Conf. 19, pp. 455-466, Mar. 5, 2003.

* cited by examiner

```
<?xml version="1.0"?>
<el0 xmlns="urn:myExampleNS" xmlns:if="urn:mpeg:mpeg21:200x:01-SI"
  if:puMode="ancestorsDescendants"
  if:timeMode="relative"
  if:timeScale="22050"
  if:timeInterval="1024">
  <el1 anAttribute="value"
       if:anchorElement="true">Content of /el1</el1>
  <el2>
    <el21>
      <el211 if:anchorElement="true">Content of /el211</el211>
    </el21>
    <el22 if:anchorElement="true">
      <el221/>
      <el222/>
    </el22>
  </el2>
  <el3/>
</el0>
```

FIG. 8

```
<?xml version="1.0"?>
<StreamingInstructions
  xmlns="urn:mpeg:mpeg21:200x:01-SI"
  xmlns:xsi="http://www.w3.org/2001/XMLSchema-instance"
  xsi:schemaLocation="urn:mpeg:mpeg21:200x:01-SI
                      ../Schemas/DIS/StreamingInstructions.xsd">

<template match="/p:el0/p:el1 | /p:el0/p:el2/p:el21/p:el211 |
                   /p:el0/p:el2/p:el22">
    <addAttribute name="if:anchorElement" namespace="urn:mpeg:mpeg21:200x:01-SI"
                  value="true"/>
  </template>

<template match="/p:el0">
    <addAttribute name="if:puMode" namespace="urn:mpeg:mpeg21:200x:01-SI"
                  value="ancestorsDescendants"/>
    <addAttribute name="if:timeScale" namespace="urn:mpeg:mpeg21:200x:01-SI"
                  value="22050"/>
    <addAttribute name="if:timeInterval" namespace="urn:mpeg:mpeg21:200x:01-SI"
                  value="1024"/>
    <addAttribute name="if:timeMode" namespace="urn:mpeg:mpeg21:200x:01-SI"
                  value="relative"/>
  </template>
</StreamingInstructions>
```

FIG. 9

```
<?xml version="1.0"?>
<schema xmlns="http://www.w3.org/2001/XMLSchema"
  xmlns:si="urn:mpeg:mpeg21:200x:01-SI"
  targetNamespace="urn:mpeg:mpeg21:200x:01-SI"
  elementFormDefault="qualified"
  version="ISO/IEC 21000-xx"
  id="StreamingInstructions.xsd">
  <annotation>
    <documentation>
      Declaration of attributes used for streaming instructions
    </documentation>
  </annotation>

<attribute name="anchorElement" type="boolean" fixed="true"/>
  <attribute name="puMode" type="si:puModeType"/>
  <simpleType name="puModeType">
    <restriction base="string">
      <enumeration value="self"/>
      <enumeration value="ancestors"/>
      <enumeration value="descendants"/>
      <enumeration value="ancestorsDescendants"/>
      <enumeration value="ancestorsDescendantsPrecedingSibling"/>
    </restriction>
  </simpleType>

<attribute name="timeMode" type="si:timeModeType"/>
  <simpleType name="timeModeType">
    <restriction base="string">
      <enumeration value="absolute"/>
      <enumeration value="relative"/>
    </restriction>
  </simpleType>
  <attribute name="timeScale" type="unsignedInt"/>
  <attribute name="timeInterval" type="unsignedInt"/>
  <attribute name="absTimeScheme" type="string"/>
  <attribute name="absTime" type="string"/>

<element name="StreamingInstructions">
    <complexType>
      <sequence>
        <element name="template" minOccurs="0" maxOccurs="unbounded">
          <complexType>
            <sequence>
              <element name="addAttribute" minOccurs="0" maxOccurs="unbounded">
                <complexType>
                  <attribute name="name" type="string" use="required"/>
                  <attribute name="namespace" type="string"/>
                  <attribute name="value" type="string"/>
                </complexType>
              </element>
            </sequence>
            <attribute name="match" type="string" use="required"/>
          </complexType>
        </element>
      </sequence>
    </complexType>
  </element>
</schema>
```

FIG. 10

METHOD FOR PROCESSING A DATA TREE STRUCTURE

RELATED APPLICATIONS

This is a U.S. national stage of application No. PCT/FR2006/050317, filed on Apr. 7, 2006.

This application claims the priority of French patent application no. 05/03642 filed Apr. 12, 2005, the content of both of which is hereby incorporated by reference.

FIELD OF THE INVENTION

The present invention relates a method of processing a tree data structure organized into interconnected elements.

The invention applies generally to the field of telecommunications, in particular telecommunications via the Internet. However, one more particularly advantageous application of the invention relates to transmitting metadata progressively (streaming), in particular for adapting scalable multimedia contents.

BACKGROUND OF THE INVENTION

The contribution MPEG SC29/WG11 M11611 (71st MPEG Meeting, Hong Kong, China, 17/21-01-2005) defines a method of streaming a digital item conforming to the concept defined by the MPEG-21 standard (ISO/IEC TR 2100-1:2004, Part 1: Vision, Technologies and Strategy) and represents the fundamental transaction and distribution unit in the MPEG-21 context. A digital item is an abstraction of one or more semantically linked multimedia contents (for example videos, images, audio) and any metadata linked to those contents, the whole constituting a transaction and end-use unit.

The metadata linked to the digital item is frequently written in the widely used data tree structuring language known as XML (eXtensible Mark-Up Language). Since the digital item is intended to be communicated, where applicable via Internet type networks, the problem arises of transmitting metadata contained therein, and more generally of transmitting XML documents.

In particular, it is beneficial to stream (transmit progressively) an XML document so that the destination entity can use the fragment it has received without having to wait to receive the entire document. Moreover, the use of an XML document is some times linked to the use of other data that is sent continuously, such as a video stream. It is then necessary to synchronize the various data streams mutually, and for this purpose to assign timing information to the fragments of the XML document.

The above-mentioned MPEG contribution proposes a solution for fragmenting a digital item and for assigning timing information to the fragments obtained. It applies to XML documents in particular, although it is not limited to them. That solution indicates the fragments to be transmitted by means of Xpath expressions, Xpath (XML Path Language, version 1.0, W3C Recommendation, 16 Nov. 1999) being an expression language for identifying a node or a set of nodes in an XML document. Moreover, a parameter is used to define a transmission time for those fragments.

That prior art processing method has some drawbacks, however:

Firstly, that method uses the expression language XPath to select the fragment of an XML document. The problem with XPath is that the entire XML document must be loaded into memory for an expression to be evaluated. For small XML documents, this is not a problem. In contrast, for large documents, that can consume considerable memory resources and can significantly reduce system performance.

Secondly, and for the same reason, the method cannot be employed for XML documents generated on the fly.

Thirdly, the timing information applied to a fragment cannot define a time relative to a preceding fragment.

SUMMARY OF THE INVENTION

Against that background, a technical problem to be solved by the present invention is to propose a method of processing a tree data structure organized into interconnected elements that makes it possible to select a set of fragments, in particular in an XML type document, and to assign them timing information flexibly.

Also, apart from the fact that it should require limited memory resources regardless of the size of the document to be streamed, this method should also be applicable to a document that is generated on the fly.

According to an embodiment of the present invention, the solution to the stated technical problem consists in that said method comprises the operations of:

defining processing units as subsets of interconnected elements; and assigning each processing unit a processing time at which the data of the associated processing unit is to be used by an entity to which said data is addressed.

An embodiment of the invention provides more particularly for each processing unit to be defined on the basis of a given element called the anchor-element as a set of elements linked to said anchor-element in accordance with a given attachment mode.

According to an embodiment of the invention, said attachment mode is chosen from the following modes: "simple", "ancestors", "descendants", "ancestors and descendants", "ancestors, descendants, and preceding siblings". These various attachment modes are defined below.

The invention further provides for said processing time to be defined by a time addressing mode and a time specification mode.

In a first implementation of the invention, said time addressing mode is an absolute addressing mode and the processing time of a processing unit is defined absolutely in time. Said processing time specification mode is then the processing time in a given specification format.

In a second implementation of the invention, said time addressing mode is a relative addressing mode and the processing time of a processing unit is defined relative to the preceding processing unit. The processing time specification mode consisting of a time interval can then be envisaged, and likewise said time interval being expressed as a number of units on a time scale.

As disclosed in detail below, the invention can be implemented statically or dynamically.

More precisely, when implemented statically, the method of the invention, implemented by means of a document that structures data in the form of a tree, is noteworthy in that the modes assigned to said elements are specified in said document.

Moreover, when implemented dynamically, the method of the invention, implemented by means of a document that structures data in the form of a tree, is noteworthy in that said document is associated with a template document in which the modes assigned to the elements concerned of said document are specified.

In particular, there is provision for said template document to contain a set of templates, each template being defined by a template pattern and by a set of attributes to be specified for the element or elements satisfying said template pattern.

Finally, another embodiment of the invention also relates to a server for implementing the method discussed above, to a computer program comprising program code instructions for executing the method when said program is executed in a computer, and to a signal representing a document that structures data in the form of a tree specifying a processing unit and an associated processing time by means of an attribute.

BRIEF DESCRIPTION OF THE DRAWINGS

The following description with reference to the appended drawings, provided by way of non-limiting example, explain clearly the embodiments of the invention and how they can be reduced to practice.

FIG. 10 shows the syntax of the attributes and the templates used by the method of the invention.

DETAILED DESCRIPTION OF THE DRAWINGS

Figure 1:
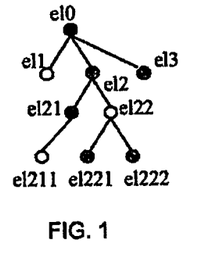
FIG. 1 shows a tree structure of interconnected elements.

FIG. 1 shows a tree data structure organized into interconnected elements. An element corresponds to a node of the tree and is generically identified by the letters el. The first element el0 of the tree is called the root.

Figure 2A:
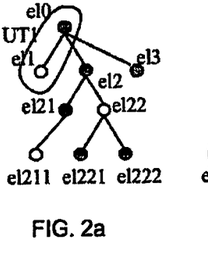
FIGS. 2a, 2b, and 2c show three processing units from the FIG. 1 tree structure.
Figures 2B, 2C:
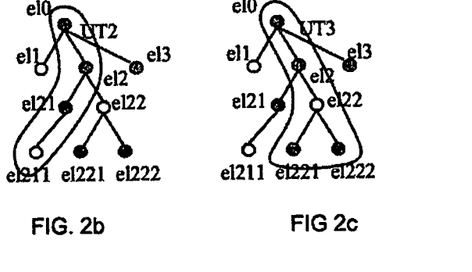

FIGS. 2a, 2b, and 2c show three processing units UT1, UT2, and UT3 of this structure that are subsets, or fragments, of the tree that can be used as such by a destination entity. A fragment is any connected set of elements. The processing unit UT1 comprises the elements el0 and el1, the processing unit UT2 comprises the elements El0, el2, el21, and el211, and the processing unit UT3 comprises the elements el0, el2, el22, el221, and el222.

Figure 3:
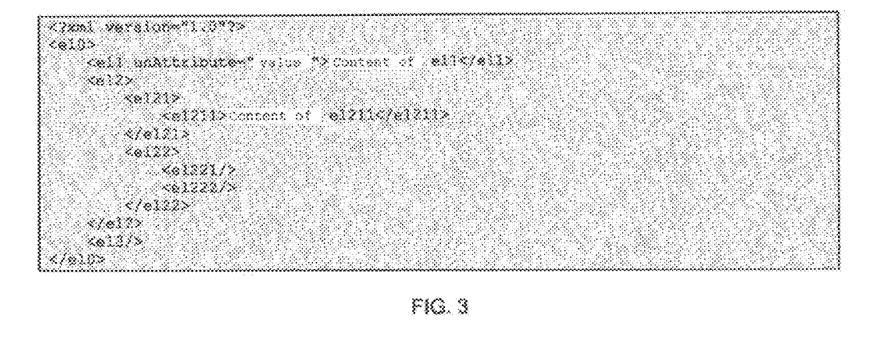
FIG. 3 shows an XML document associated with the FIG. 1 tree structure.

The FIG. 3 XML document is associated with the FIG. 1 tree structure. Of course, the invention is not limited to XML documents alone and can be applied to any tree data structure.

It is assumed that the destination application can use this document progressively. In this context, a processing unit is a fragment of the document that can be used independently of the rest of the document.

Figure 4A:
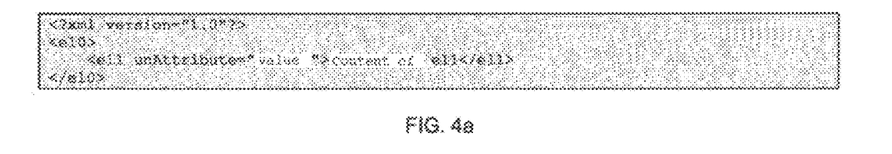
FIGS. 4a, 4b, and 4c show XML documents associated with the processing units from FIGS. 2a, 2b, and 2c, respectively.
Figure 4B:
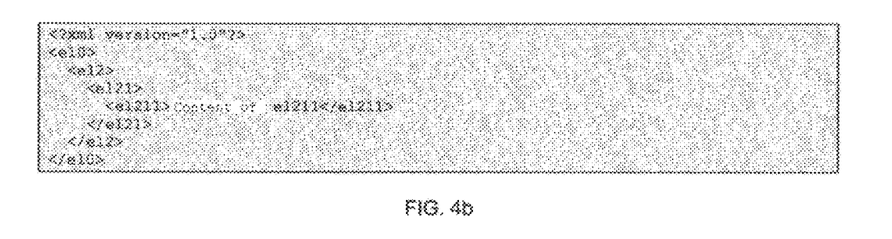
Figure 4C:
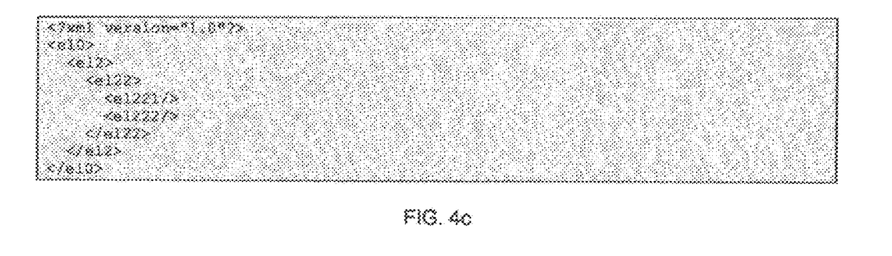

FIGS. 4a, 4b, and 4c show XML documents extracted from the FIG. 3 original document, which could be associated with the processing units UT1, UT2, and UT3, respectively, and stored independently with the original document in the memory of a server.

However, this solution would introduce a risk of inconsistency, caused by the redundancy of the data, and unnecessary consumption of storage space and bandwidth.

It is to avoid these drawbacks that an embodiment of the invention proposes the processing method that is described below with reference to FIGS. 5 to 10.

Broadly speaking, this processing method provides a method of defining said processing units and assigns each processing unit a processing time at which the data of the associated processing unit is to be used by the entity that constitutes the destination of said data.

The processing units are defined on the basis of a given element, called the anchor-element, as a set of elements linked to said anchor-element in accordance with a given attachment mode. In FIGS. 2a, 2b, and 2c, the anchor-elements of the processing units UT1, UT2, and UT3 are el1, el211, and el22, respectively, represented by a white circle in the tree.

Various attachment modes can be envisaged, namely the "simple", "ancestors", "descendants", "ancestors and descendants", and "ancestors, descendants and preceding siblings" attachment modes.

In the "simple" attachment mode, the processing unit contains only the anchor-element itself.

In the "ancestors" attachment mode, the processing unit contains the anchor-element and all its ancestors.

In the "descendants" attachment mode, the processing unit contains the anchor-element and all its descendants.

In the "ancestors and descendants" attachment mode, the processing unit contains the anchor-element, all its descendants, and all its ancestors.

In the "ancestors, descendants, and preceding siblings" attachment mode, the processing unit contains the anchor-element, its descendants, its ancestors, the elements preceding its ancestors, and their descendants.

In FIGS. 2a, 2b, and 2c, the processing units UT1, UT2, and UT3 are defined by applying the "ancestors and descendants" attachment mode to their respective anchor-elements.

The anchor-element and attachment mode concepts are used to define properties that apply to the elements of the tree structure to be streamed to the destination entity.

The anchor-element concept corresponds to the property whereby an element is or is not an anchor-element. Similarly, the attachment mode concept corresponds to the property whereby an element is attached to the anchor-element according to a given attachment mode.

According to the "anchor-element" property, an anchor-element defines one and only one processing unit. In contrast, it can belong to other processing units. Reciprocally, a processing unit is identified by one and only one anchor-element. In contrast, it can contain other anchor-elements.

When the processing method of the invention is implemented by an XML document, for example, a property of an element is either defined by an XML attribute or inherited from its parent element.

Figure 5:
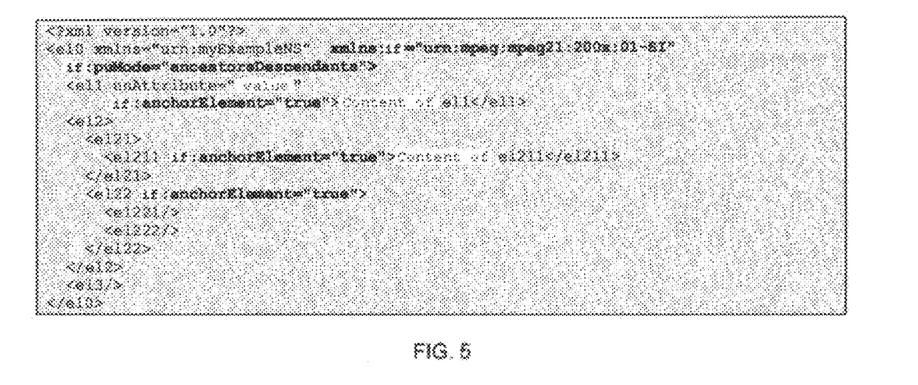
FIG. 5 shows an XML document associated with the processing units from FIGS. 2a, 2b, and 2c in accordance with the processing method of the invention.
Figure 6:
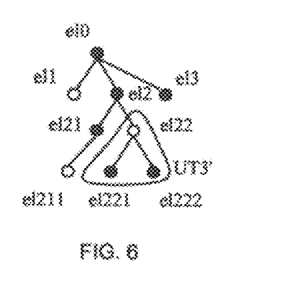
FIG. 6 shows a variant of the FIG. 2c processing unit.
Figure 7:
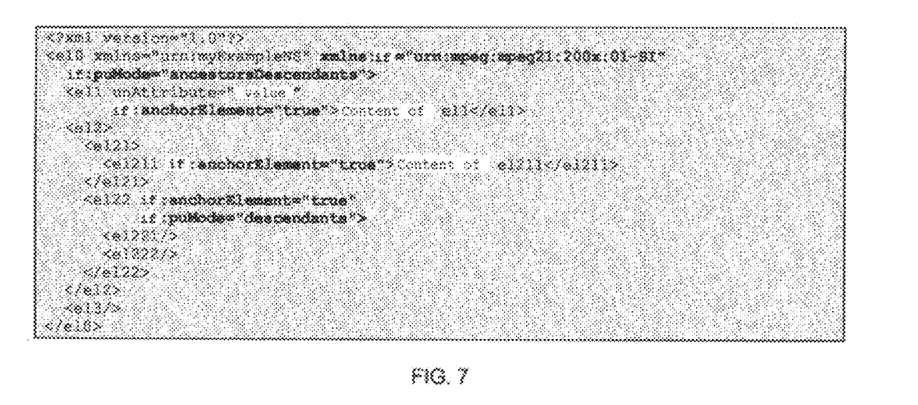
FIG. 7 shows a variant of the FIG. 5 XML document associated with the FIG. 6 variant.

FIG. 5 shows how the processing units from FIGS. 2a, 2b, and 2c can be selected statically in the original XML document shown in FIG. 3.

The "anchor-element" property is reflected in the "anchorElement" attribute assigned to the elements el1, el211, and el22. The value of the anchor-element attribute is Boolean: an element is an anchor-element if and only if it contains the "anchor-element" attribute with the value "true".

There exists a relationship of order defined for the elements of an XML document that corresponds to the following navigation paths: with the document scanned from left to right and from top to bottom, the order of the elements is the order of occurrence of the opening tags. For example, in the FIG. 3 document, the elements are ordered as follows: {el0, el1, el2, el21, el211, el22, el221, el222, el3}. The order of the processing units is the order of the anchor-elements that define them. That order is used below, in particular for relative time addressing defining the processing time of a processing unit relative to the preceding processing unit.

Note that the "anchor-element" property cannot be inherited in the sense that an element cannot inherit this property from a parent element.

The second property linked to the attachment mode is reflected in a "puMode" attribute that is used to select a processing unit on the basis of the anchor-element. This property is either defined directly by the "puMode" attribute or inherited from the parent element. Its value is one of the following:

"self" for the "simple" attachment mode;
"ancestors" for the "ancestors" attachment mode;
"descendants" for the "descendants" attachment mode;
"ancestorsDescendants" for the "ancestors and descendants" attachment mode;
"ancestorsDescendantsPrecedingSibling" for the "ancestors, descendants and preceding siblings" attachment mode.

In the document shown in FIG. 5, the "puMode" attribute is used in the root element el0 to define the property puMode with the value "ancestorsDescendants", for example. Here this property is inherited by all the elements of the document. The anchor-elements el1, el211, and el22 therefore inherit this property. Each therefore defines a processing unit as a function of that property as explained above. The processor unit UT1, UT2, and UT3 defined in this way correspond to the three documents represented in FIGS. 4a, 4b, and 4c and represented graphically in FIGS. 2a, 2b, and 2c.

In this example, the puMode property is defined once for the root element by the "puMode" attribute and then inherited by the other elements. It is equally possible to define this property separately for other elements. If the processor unit UT3 from FIG. 2c is replaced by the processor unit UT'3 from FIG. 6, for which the anchor-element is still the element el22 but for which the puMode property is defined by the "descendants" attachment mode, then the "descendants" value of the "puMode" attribute must be specified in the anchor-element el22.

The mechanism proposed by the invention for defining properties by way of attributes and inheritance therefore defines properties with a fine granularity (i.e. for each element independently, if necessary) and efficiently: if the elements of a subtree of the document share the same property, it is not necessary to add the attribute to each element to define that property. It suffices to add an attribute to the root element of the subtree and the property defined in this way is then inherited by all its descendants.

This same mechanism is applied by analogy to assign a processing time to a processing unit.

A first property timeMode defines the time addressing mode. It is either defined by a "timeMode" attribute or inherited from the parent element. The values of the "timeMode" attribute are as follows:

"undefined": the time addressing mode is not defined;
"relative": the time addressing mode is relative, i.e. the processing time of a processing unit is defined relative to the preceding unit;
"absolute": the time addressing mode is absolute, i.e. the processing time of a processing unit is defined absolutely.

A second property timeScale defines the time scale for relative time addressing. It is either defined by a "timeScale" attribute or inherited from the parent element. Its value is an integer defining the time scale, i.e. the number of units per second.

A third property timeInterval defines the time interval between two consecutive processing units for relative time addressing. It is either defined by a "timeInterval" attribute or inherited from the parent element. Its value is an integer defining the number of time units relative to the preceding processing unit, the time unit being defined by the timeScale property defined above.

A fourth property absTimeScheme defines the addressing format for absolute time addressing. It is either defined by an "absTimeScheme" attribute or inherited from the parent element. Its value is a character stream defining the time addressing format. For example, the stream "mp7t" denotes the time addressing format defined by MPEG-7 MDS (MediaTimePointType).

Finally, a fifth property absTime defines the processing time for absolute time addressing. It is not inherited, and is defined by an "absTime" attribute. It value is a character stream defining the time according to the time addressing format defined by the absTimeScheme property. One example of this value for the MPEG-7 addressing format is "T17:30:45:2F10".

Figure 8:
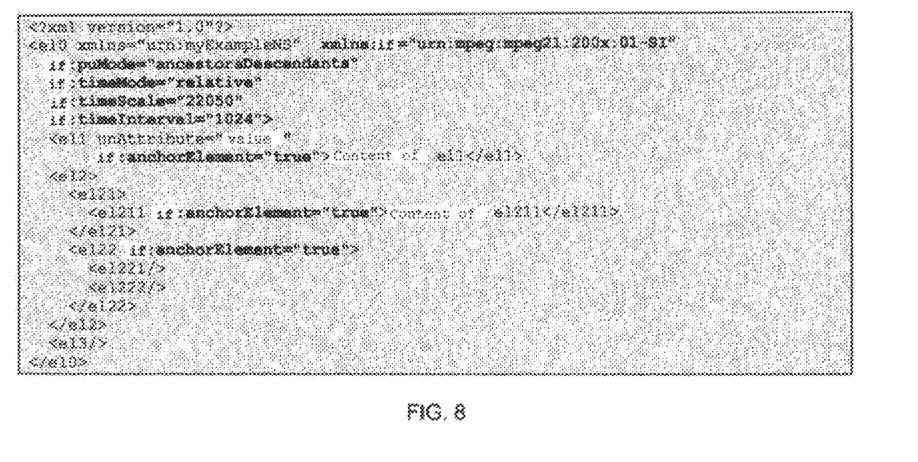
FIG. 8 shows the XML document from FIG. 5 including processing time attributes for the processing units.

For example, in the document shown in FIG. 8, the "timeMode", "timeScale", and "timeInterval" attributes applied to the root element el0 indicate that time addressing for that element is relative, the time scale is 22050 units per second, and the interval between two processing units is 1024 units. Here these properties are inherited by the elements of the document and in particular by the anchor-elements. The processing units inherit these properties from their respective anchor-elements. The processing unit UT1 will therefore be presented to the destination application at the time t1=0, the processing unit UT2 at the time t2=1024/22050 seconds, and the processing unit UT3 at the time t3=2048/22050 seconds.

It has been shown above how the properties defining the processing units and their associated processing time can be specified by means of attributes added statically to the original document, as illustrated by the FIG. 8 document.

How these attributes can be added dynamically by applying a set of templates is explained below.

In this dynamic implementation, the original XML document, like that from FIG. 3, is associated with a template document in which each template is defined by a template pattern. This pattern defines the XML elements to which this template will be applied and a set of attributes that will then be added to those elements. The syntax of all of the attributes and the templates is defined in FIG. 10.

Figure 9:
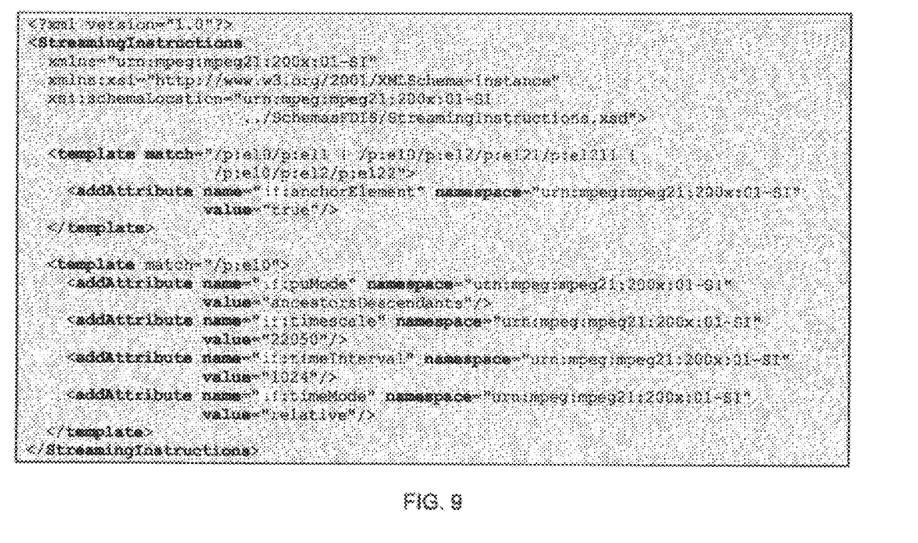
FIG. 9 shows a template document associated with the FIG. 3 XML document.

FIG. 9 gives an example of a dynamic template document. The result of this example is identical to the use of the static instructions from FIG. 8.

The template pattern is written with a syntax derived from the expression language STXPath defined in STX (Streaming Transformations for XML (STX), Version 1.0, Working Draft 1 Jul. 2004). STX is an XML transformation language for transforming an XML document on the fly, i.e. without having to load all of the document into memory first. This enables transformation of large XML documents and documents that are generated on the fly and consequently cannot be made available in their entirety. STXPath is therefore particularly suitable for the context of the present invention.

The STXPath syntax is close to XPath. In contrast, its semantics are different. In XPath, as in STXPath, an expression is resolved relative to a context element. To evaluate the expression, XPath must take into account a context that consists in the whole of the document. In contrast, STXPath considers only the context element and the stack of its ancestors. The context necessary for resolution in STXPath is therefore limited and thus is particularly suitable for the context of the present invention. STXPath is used in particular to express constraints on the names of the elements of the context, their ordinal number, and the names and the values of their potential attributes.

For example, the XPath expression "/el1/el2" selects all the elements named el2 whose parent element is named el1 and is the root of the document. The same expression in STXPath selects at most one element, the element in the stack of the ancestors of the context element whose parent element is named el2 and its parent is named el1.

A given implementation can use a subset of STXPath to provide a filtering process that is both flexible and fast.

Figure 11:
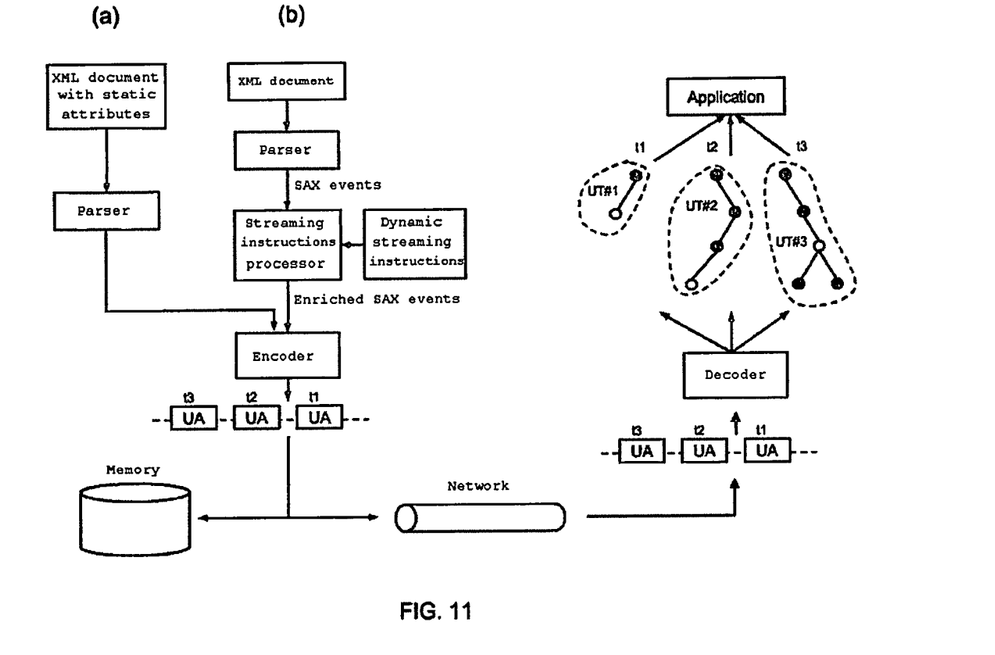
FIG. 11 is a diagram showing the processing stream of the elements of the XML document from FIG. 3 for the method of the invention (a) in static mode and (b) in dynamic mode.

The processing of the elements of the XML document from FIG. 3 in accordance with the method of the invention is explained below with reference to FIG. 11, (a) in static mode and (b) in dynamic mode.

The original XML document is read by a software module called a syntax analyzer (parser). Several sorts of parser are widely used. These modules enable an application to access information contained in an XML document via a given application programming interface (API). All the information contained in a XML document is modeled by an abstract model called Infoset standardized by the Web Consortium (XML Information Set (Second Edition), W3C Recommendation 4 Feb. 2004).

Embodiments of the invention can be used with several types of parser, such as DOM (Document Object Model) (Document Object System Level 2 Core Specification, Version 1.0, W3C Recommendation 13 Nov. 2004) or SAX (Simple API for XML). The invention is described here using SAX, an implementation that is efficient in terms of memory consumption.

A SAX type parser reads an XML document and outputs a sequence of events describing the content. For example, reading the general document represented in FIG. 3 gives rise in substance to the following sequence of events:

| Event | This event signals: |
| --- | --- |
| startDocument | the start of the document |
| startElement el0 | the start of the element el0 + list of attributes declared for el0 |
| startElement el1 | the start of the element el1 + list of attributes declared for el1 |
| endElement el1 | the end of the element el1 |
| startElement el2 | the start of the element el2 + list of attributes declared for el2 |
| startElement el21 | the start of the element el21 + list of attributes declared for el21 |

Embodiments of the invention enriches the Infoset of the XML document with information defining the processing units.

In the static mode (a), attributes are added to the original document, as shown in FIG. 8. The SAX parser thus generates a SAX event sequence containing the enriched information.

In the dynamic mode (b), events generated by analyzing the original document are processed by a bank of templates to add attributes on the fly. A module called the streaming instructions processor receives as input the SAX events output by the parser reading the original document, applies the templates specified in the document called Dynamic Streaming Instructions, and outputs a SAX event sequence containing the enriched information. The encoder therefore receives an Infoset enriched with streaming instructions just as if the instructions had been added statically to the original XML document. The remainder of the process is therefore identical to the situation of static instructions.

The encoder then uses the information defining the processing units to encode them. The output of the encoder consists in a sequence of access units UA, which are data entities encoded for transport, so that decoding the successive access units reconstructs the processing units as defined by the streaming instructions.

Several encoding methods can be used, such as MPEG-7 Systems (ISO/IEC 15938-1: 2002, Part 1: Systems), TeM (text encoding) or BiM (binary encoding). Several encoding strategies are possible for each encoding method.

The access units can then be sent via a network (for example the Internet) or concatenated in a memory to be sent later. FIG. 11 shows both these cases. In each case, each access unit is associated with a processing time that specifies the time at which the processing unit must be available to the destination entity in order to be used, where applicable after being decoded. The right-hand part of FIG. 11 shows the use of the access units by the destination entity.

The invention claimed is:

1. A method of progressively transmitting data via a telecommunications network by processing a tree data structure organized into interconnected elements, the method comprising:
    defining processing units as subsets of interconnected elements of said tree data structure by way of properties, specifying for each subset an anchor-element, wherein said anchor-element is an interconnected element of said subset, and applying to each of the specified anchor-elements an attachment mode property, by inheritance from a parent element or by directly defining an attribute of the attachment mode property of the specified anchor-element, by which the elements of each subset are linked to the respective specified anchor-element, each processing unit of said tree data structure being defined by one and only one specified anchor-element, wherein an identifier of a specified anchor-element of a particular processing unit and the applied attachment mode property of the specified anchor-element select all of the elements of the particular processing unit;
    assigning each defined processing unit a time of processing, which specifies a relative or absolute time of day at which the data of the associated processing unit is to be used by an entity to which said data is addressed, by way of properties defining said time of processing;
    assigning, to said interconnected elements of said tree data structure, said properties defining said processing units and their associated time of processing by applying attributes to said elements,
    wherein the attachment mode properties comprise:
        a "simple" attachment mode, in which the processing unit contains only the anchor-element,
        an "ancestors" attachment mode, in which the processing unit contains only the anchor-element and all ancestors of said anchor-element,
        a "descendants" attachment mode, in which the processing unit contains only the anchor-element and all descendants of said anchor-element, an "ancestors and descendants" attachment mode, in which the processing unit contains only the anchor-element and all the descendants of said anchor-element and all the ancestors of said anchor-element, and an "ancestors, descendants and preceding siblings" attachment mode, in which the processing unit contains only the anchor-element, the descendants of said anchor-element, the ancestors of said anchor-element, all elements preceding said ancestors, and descendants of said elements preceding said ancestors; and transmitting the processing units to the entity to which said data is addressed via the telecommunications network.

2. The method according to claim 1, characterized in that said properties defining said time of processing of a processing unit define a time addressing mode and a time specification mode.

3. The method according to claim 2, characterized in that said time addressing mode is an absolute addressing mode and the time of processing of a processing unit is defined absolutely in time.

4. The method according to claim 2, characterized in that said time of processing specification mode is the time of processing in a given specification format.

5. The method according to claim 2, characterized in that said time addressing mode is a relative addressing mode and the time of processing of a processing unit is defined relative to the preceding processing unit.

6. The method according to claim 2, characterized in that the time of processing specification mode is a time interval.

7. The method according to claim 6, characterized in that said time interval is expressed as a number of units on a time scale.

8. The method according to claim 1, implemented by a document structuring data in the form of a tree, characterized in that the modes assigned to said elements are specified in said document.

9. The method according to claim 8, characterized in that in said document each anchor-element of a processing unit is assigned an "anchorElement" attribute specifying the anchor-element character of the corresponding element and a "puMode" attribute specifying the attachment mode associated with said anchor-element.

10. The method according to claim 9, characterized in that a "puMode" attribute assigned to a given element is inherited by all the descendant elements of said given element in the document.

11. The method according to claim 10, characterized in that a "puMode" attribute assigned to a given element is inherited by all the descendant elements of said given element in the document up to an element which is assigned a "puMode" attribute different from said attribute.

12. The method according to claim 9, characterized in that the attachment mode of a processing unit is determined by the "puMode" attribute assigned to the anchor-element of said unit.

13. The method according to claim 9, characterized in that an element of each processing unit is assigned a time addressing "timeMode" attribute and a time specification attribute.

14. The method according to claim 13, characterized in that in absolute time addressing mode said time specification attribute comprises an "absTimeScheme" attribute in the time specification format and an "absTime" attribute for specifying the time of processing in said format.

15. The method according to claim 13, characterized in that in the relative time addressing mode said time specification attribute comprises a time scale attribute denoted "timeScale" and a time interval attribute denoted "timeInterval".

16. The method according to claim 13, characterized in that "timeMode", "absTimeScheme", "timeScale", and "timeInterval" attributes as signed to a given element are inherited by all the descendant elements of said given element in the document.

17. The method according to claim 13, characterized in that "timeMode", "absTimeScheme", "timeScale", and "timeInterval" attributes assigned to a given element are inherited by all the descendant elements of said given element in the document up to an element which is assigned a "timeMode", "absTimeScheme", "timeScale" or "timeInterval" attribute different from said attribute.

18. The method according to claim 13, characterized in that time addressing mode, the time specification format, the time scale, and the time interval of a processing unit are determined by the "timeMode", "absTimeScheme", "timeScale", and "timeInterval" attributes assigned to the anchor-element of said unit.

19. The method according to claim 1, implemented by a document structuring data in the form of a tree, wherein said document is associated with a template document in which the modes assigned to the elements concerned of said document are specified.

20. The method according to claim 19, characterized in that said template document contains a set of templates, each template being defined by a template pattern and a set of attributes to be specified for the element or elements satisfying said template pattern.

21. The method according to claim 20, characterized in that said template pattern applied to a given element specifies one or more conditions on the sequence of ancestors of said given element, said given element itself, and their attributes, if any.

22. The method according to claim 21, characterized in that said conditions are adapted to constrain the names and the ordinal numbers of said elements and the names and the values of said attributes.

23. A server comprising a memory and a processor implementing the method according to claim 1.

24. A non-transitory computer-readable medium storing a computer program comprising program code instructions for executing the method according to claim 1, when said program is executed in a computer.

25. A method of encoding of tree data structure processed by a processing method according to claim 1, for a sequence of access units, wherein the method of encoding comprises encoding said properties which are assigned to said elements of said tree data structure.

26. A method of decoding a sequence of access units sent via a network, said sequence being representative of a tree data structure organized into interconnected elements, and said sequence being encoded by an encoding method according to claim 25, said method of decoding comprising:
    decoding of said access units successively;
    extracting from said access units properties defining processing units and their associated time of processing; and
    reconstructing said processing units using said extracted properties.

27. An access unit including data of a tree data structure organized into interconnected elements, wherein said access unit comprises attributes defining processing units and their associated time of processing, said attributes being assigned to elements of said tree data structure by the processing method according to claim 1.

* * * * *